United States Patent [19]

Pichler et al.

[11] 4,087,858

[45] May 2, 1978

[54] ACCOUNTING AND CASH-TRANSFER SYSTEM FOR FILLING STATIONS HAVING METERED PUMPS

[75] Inventors: Peter Pichler, Steiermark; Dietrich Ranner, Salzburg, both of Austria

[73] Assignee: Aral Austria Gesellschaft m.b.H., Vienna, Austria

[21] Appl. No.: 749,753

[22] Filed: Dec. 13, 1976

Related U.S. Application Data

[63] Continuation-in-part of Ser. No. 732,395, Oct. 14, 1976, abandoned.

[30] Foreign Application Priority Data

Oct. 14, 1975 Austria ................................ 7837/75

[51] Int. Cl.2 .......................... B67D 5/08; G06F 7/38; G07F 7/04

[52] U.S. Cl. ...................................... 364/465; 222/23; 235/431; 235/92 FL

[58] Field of Search ......... 235/151.34, 92 FL, 61.7 R, 235/61.7 A; 222/36, 30, 23

[56] References Cited

U.S. PATENT DOCUMENTS

| | | | |
|---|---|---|---|
| 3,312,812 | 4/1967 | Schmitt | 235/151.34 |
| 3,858,758 | 1/1975 | May | 235/151.34 X |
| 3,878,377 | 4/1975 | Brunone | 235/151.34 |
| 3,895,738 | 7/1975 | Buchanan et al. | 235/151.34 X |
| 3,935,435 | 1/1976 | Greenwood | 235/151.34 |
| 3,949,207 | 4/1976 | Savary et al. | 235/151.34 |

*Primary Examiner*—Edward J. Wise

*Attorney, Agent, or Firm*—Karl F. Ross

[57] ABSTRACT

A filling station with several pumps, dispensing various types of fuel, includes an electronic control unit with a counter receiving trains of backward-counting pulses from the outputs of various pulse generators driven by flowmeters installed in the several pump outlets. The counter also receives forward-counting pulses indicating the amount of money deposited by the station attendant in a locked cash box; upon depletion of the available credit balance, as indicated by a zero pulse count, the control unit stops the dispensation of fuel from all pumps. Another counter, receiving only the forward-counting pulses, has a presettable upper limit for preventing deposition of more than a predetermined maximum amount in the cash box; when that limit is reached, the box must be taken to a depositary accessible only to representatives of the station owner or the fuel supplier while an alternate cash box is substituted therefor at the filling station. The cash boxes have code markings, preventing their replacement by unauthorized receptacles, and are also provided with magnetic-core memories communicating with the control unit upon insertion to indicate whether the box is empty (or not more than partly filled) or full.

20 Claims, 6 Drawing Figures

ACCOUNTING AND CASH-TRANSFER SYSTEM FOR FILLING STATIONS HAVING METERED PUMPS

CROSS-REFERENCE TO RELATED APPLICATION

This is a continuation-in-part of our copending application Ser. No. 732,395 filed 14 Oct. 1976 and now abandoned.

FIELD OF THE INVENTION

Our present invention relates to an accounting and cash-transfer system designed too supervise the operation of a filling station having one or more pumps with nozzles or other outlets for the dispensation of liquid products, such as fuels for automotive vehicles.

BACKGROUND OF THE INVENTION

The operators of such stations generally lease the facilities from a proprietor, sharing in the proceeds, and/or obtain the products on a commission basis from a supplier. Thus, moneys collected by the station operator must be accounted for to such proprietor or supplier, e.g. by being delivered to a bank safe or other depository which can be emptied only by the recipient. The latter, obviously, is interested in promptly receiving these payments and avoiding an excessive accumulation of cash at the filling station.

Self-service stations are known in which a customer inserts bills or coins into a register which thereupon releases a corresponding quantity of fuel. If the register is designed to receive paper money, the bills are scanned by a testing head which verifies their genuineness and discriminates among different denominations. Thus, there exists an exact correlation between fuel volume and amount paid, with no provision for credit or overdraft. These devices, accordingly, are not suitable for transactions between the operator of a filling station and a supplier delivering fuel on credit or commission.

OBJECTS OF THE INVENTION

The general object of our present invention, therefore, is to provide a system for automatically safeguarding the interests of the proprietor of a filling station, or the supplier of meterable fluids for that station, by insuring the timely remittance of the proper amount of money to that interested party by the station operator or lessee.

A more particular object is to provide means in such a system for discontinuing the dispensation of meterable fluids (referred to hereinafter, for convenience, as fuels) from a station whose operator fails to remit, soon after collection, an amount of cash corresponding to a predetermined credit limit.

It is also an object of our invention to provide a tamperproof money receptacle, referred to hereinafter as a cash box, for the purpose of transferring the proceeds of the filling station (less operator's share) to a depository accessible to the recipient whenever the quantity of dispensed fuels has reached a predetermined limit.

SUMMARY OF THE INVENTION

In accordance with our present invention, money collected by station personnel for the sale of fuel — reduced by the operator's commission or discount — is receivable in a cash box provided with an entrance aperture, the interior of this cash box being inaccessible to the station personnel except for the deposition of the money. Since the transactions here contemplated generally involve large amounts, the cash box need only be designed to receive paper money whose value is ascertained by test means adjacent that box. A first signal generator, coupled with the test means, and a second signal generator, coupled with a flowmeter disposed in the usual manner at each pump outlet for measuring the quantity of dispensed fuel, work into an arithmetic element such as a reversible pulse counter which registers a credit balance equal to an initial credit augmented by the amount of money deposited in the cash box and diminished by the discounted monetary value of the dispensed fuel. Whenever that credit balance drops to a predetermined minimum, the arithmetic element deactivates the pump or pumps with the aid of suitable stop means such as circuit breakers controlling the energization of the electric pump motors. If the pumps can also be operated manually, the stop means may include a mechanism for effectively disconnecting them from their storage reservoirs.

Inasmuch as the arithmetic element does not distinguish among moneys collected for fuels from different pumps, the actuation of the stop means results in the shutdown of all the pumps until a positive credit balance is restored by the deposition of additional cash in the box. Such deposition, pursuant to another feature of our invention, can proceed only until the cash box is filled to an extent determined by a ceiling registered in a presettable pulse counter which is stepped by the first signal generator. In order to avoid depletion of the available credit balance once the box is filled, an empty box must be substituted therefor. To expedite the transfer of a filled cash box to the depository for emptying by an authorized person, the number of cash boxes available to the operator of a particular station may be strictly limited, e.g. to just one pair allowing one cash box to be used for collection while the other is being taken to the depository. This insures continuity of service to the station's customers.

According to another feature of our invention, each cash box approved for use by the station personnel is provided with a coding adapted to be detected by monitoring means linked with a holder into which the box is to be operatively inserted. Failure to detect the coding prevents the deposition of further cash, thus foiling any possible attempt by station personnel to deposit the money in a different kind of receptacle. The approved cash box is provided with a shutter for obstructing its entrance aperture whenever that box is withdrawn from its holder. Access to its interior can then only be had with the aid of a key or the like enabling an authorized person to open a lock, the same person being also able to change the ceiling registered in the presettable counter. The money may be removed, for example, by a displacement of a wall of the box normally held in closed position by the lock; this displacement can also be used for the purpose of erasing data stored in one or more static memories within the cash box to indicate its degree of filling to the monitoring means responsive to the coding. Simple markings, such as a characteristic array of electrodes or permanent magnets, may be used as the coding in a manner well known per se. Accordingly to a more particular feature of our invention, however, the coding co-operates with circuitry in the monitoring means for establishing a connection between the static memory or memories and an external logic network which inhibits the release of the shutter from an aperture-obstructing position whenever the degree of filling of the cash box is significantly less than an amount indicated on an external register connected to the first signal generator, preferably the aforementioned presettable counter.

BRIEF DESCRIPTION OF THE DRAWING

The above and other features of our invention will now be described in detail with reference to the accompanying drawing in which.

GENERAL DESCRIPTION

Figure 1:
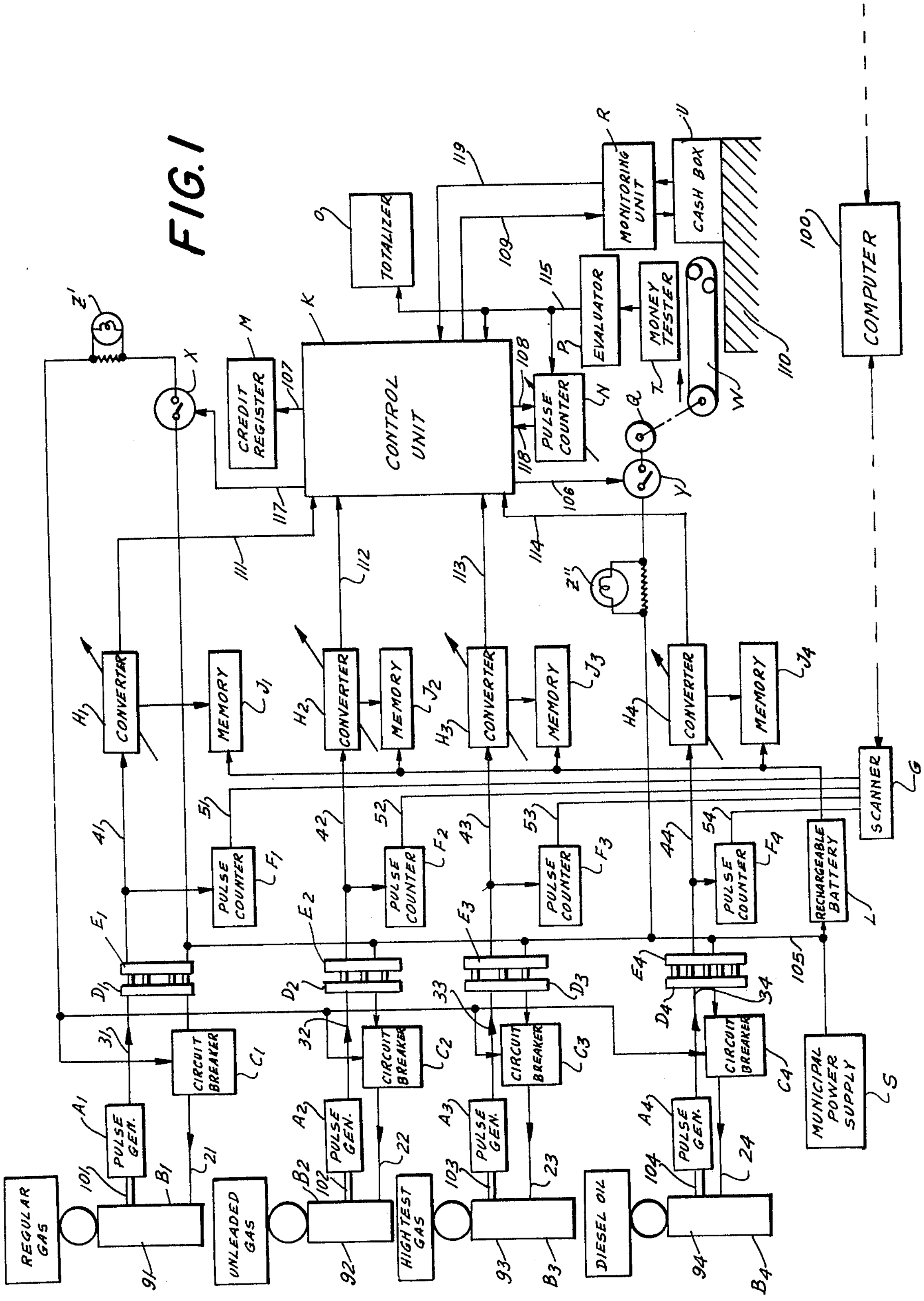
FIG. 1 is a block diagram showing the overall layout of a system according to our invention.

In FIG. 1 we have shown a filling station with four metering pumps $B_1$–$B_4$ for the dispensation of various fuels, such as regular gasoline (pump $B_1$), unleaded gasoline (pump $B_2$), high-test gasoline (pump $B_3$) and diesel oil (pump $B_4$). For the sake of simplicity, each pump is shown to have only a single outlet, i.e. a nozzle 91, 92, 93 or 94, to which fuel is supplied upon closure of a manual switch which completes an energizing circuit 21, 22, 23 or 24 for an electric drive motor not further illustrated. The motor-driven pumping mechanism is coupled with a conventional metering device, represented by its shaft 101, 102, 103 or 104, which displays the quantity of dispensed fuel together with its price in the usual manner.

Each metering shaft 101 - 104 is drivingly connected with a respective pulse generator $A_1$, $A_2$, $A_3$, $A_4$ having an output lead 31, 32, 33, 34 terminating at a jack $D_1$, $D_2$, $D_3$, $D_4$ engaged by a respective plug $E_1$, $E_2$, $E_3$, $E_4$. Each pair of mating connectors $D_1$, $E_1$ etc. is suitably coded, e.g. with the aid of interfitting formations on the connector housings, to allow any plug to be inserted only into the jack individually associated therewith. Extensions 41, 42, 43, 44 of leads 31 - 34 go from plugs $E_1$–$E_4$ to respective converters $H_1$–$H_4$ with output leads 111, 112, 113, 114 terminating at a control unit K. The connectors $D_1$–$D_4$, $E_1$–$E_4$ also serve for the energization of motor circuits 21 - 24 from a bus bar 105 tied to a municipal power supply S via the usual utility mains. Each motor circuit 21–24 includes a circuit breaker $C_1$, $C_2$, $C_3$, $C_4$.

Each pulse generator $A_1$–$A_4$, when driven by the associated metering device, emits a train of counting pulses whose recurrence frequency or cadence is a function of pump speed and therefore of the rate of fuel dispensation. The total number of pulses generated in each filling operation is thus proportional to the quantity of fuel dispensed. Aside from being fed to converters $H_1$–$H_4$, these pulses are also transmitted to respective pulse counters $F_1$, $F_2$, $F_3$ and $F_4$ having output connections 51, 52, 53 and 54 to a scanner G which communicates with a remote computer 100. The computer may be located, for example, at the headquarters of an oil company owning or supplying a number of such filling stations scattered over a wide area. By cyclically actuating the scanners G of the several stations, the computer may obtain the readings of the various counters $F_1$–$F_4$ in order to determine the rate of consumption of the various fuels at each station, e.g. as an aid in planning the delivery routes of the company trucks. The counters $F_1$–$F_4$ may be manually reset by the truck driver upon each delivery, or by remote control.

Converters $H_1$–$H_4$ are designed to change the cadences of the incoming pulse trains, by an adjustable ratio depending on the discounted or wholesale price of the respective fuels, in order to transmit to controller K a sequence of pulses representative of monetary velues (e.g. dimes or quarters) rather than volumetric units (e.g. liters or gallons). These monetary values deplete a credit balance visibly displayed on a register M which is connected with controller K via a conductor multiple 107. The credit balance is updated by another pulse sequence transmitted to controller K over a lead 115 from another pulse generator included in an evaluator P which receives output signals of a money tester T as more fully described hereinafter with reference to FIG. 6. Money tester T overlies a conveyor W, driven by a motor Q, serving to transport bills deposited thereon to an entrance aperture 14 (FIGS. 3 and 4) of a cash box U temporarily inserted into a holder 110. Box U has code means detected by a monitoring unit R which communicates with control unit K via an incoming and an outgoing conductor multiple 109, 119 in a manner subsequently described with reference to FIG. 4.

Control unit K has an output lead 117 which, when energized, closes a normally open switch X to establish a connection between bus bar 105 and circuit breakers $C_1$–$C_4$ in order to cut off the current supply to motor circuits 21–24. This off-normal condition is signaled to the station operator by an indicator here represented by a lamp Z' in series with switch X. Another output lead 106 of unit K, when energized, opens a normally closed switch Y to interrupt the current supply from bus bar 105 to conveyor motor Q. This situation is indicated by the extinction of a normally lit lamp Z" in series with switch Y.

Evaluator P converts the output signals of money tester T into a series of pulses representative of the face value of paper money transported, in the form of one or more bills, to cash box U by means of conveyor W. These pulses, appearing on lead 115, reach not only the control unit K but also a presettable pulse counter N and a totalizer O. The totalizer may be disposed at a concealed location, accessible only to authorized representatives of the proprietor or supplier, and can be manually reset; it thus registers the entire amount of cash deposited between resettings.

Pulse counter N, communicating with control unit K via a pair of multiples 108, 118, can be manually preset by an authorized person to establish a ceiling for the amount of money that can be deposited in cash box U. When that ceiling is reached, counter N signals the control unit K to open the switch Y whereby conveyor W is arrested and no further cash can be introduced into box U. If register M still indicates a sufficient credit balance, the station operator may continue to dispense fuel while the cash box U, now classified as full by an internal data store, is removed from its holder 110 to a depository for emptying by authorized persons. If a second cash box with proper coding is available, it may be put into use immediately to prevent interruption of service. Register M or control unit K may also be provided with another indicator, not shown, which alerts the operator to a near-depletion of the credit balance.

Converters $H_1$–$H_4$ are connected to respective memories $J_1$, $J_2$, $J_3$, $J_4$ which preserve their contents for an extended period, e.g. of three or more days, with the aid of static memory stages such as magnetic cores or dynamic stages energized by a rechargeable battery L in the event of a failure of the municipal power supply S. Upon restoration of that supply, the data stored in memories $J_1$–$J_4$ may be transferred, e.g. manually, to a reversible pulse counter 130 (FIG. 2) in control unit K for updating the credit balance displayed in register M. Battery L is kept fully charged by power supply S under normal conditions, as a standby source.

OPERATION

The mode of operation of the system so far described is as follows:

Let it be assumed that the station operator is given a certain amount of credit by the fuel supplier, as by preloading the arithmetic element (i.e. the counter 130 of FIG. 2) connected to the register M. Fuel may now be dispensed to customers, with actuation of the corresponding pulse generator or generators $A_1$–$A_4$ whereby control unit K receives information on the wholesale price of the dispensed fuel and correspondingly revises the reading of register M to reduce the displayed credit balance The operator, after deducting his commission from the received amount, deposits the remainder (rounded up or down to the nearest dollar) in the form of one or more bills on the conveyor W. The motor Q of this conveyor may run continuously or may be turned on by the operator at this time; it could also be started automatically by a sensor detecting the presence of one or more bills on the conveyor. As these bills pass underneath the tester T, which incidentally rejects defective specimens, their denominations are signaled by the evaluator P to control unit K so that the credit balance appearing in register M is increased by a corresponding amount. In the normal course of business, that balance will always be sufficient to prevent a shutdown of the pumps.

Pulse counter N, starting with a count of zero whenever an empty cash box U is introduced into the holder 110, advances in response to the output pulses of evaluator P and eventually reaches the limit to which it has been preset. At this point the conveyor W is halted, with a suitable delay to permit any bill already scanned by the tester T to enter the cash box, and the extinction of lamp Z″ advises the operator that a fresh, empty cash box must be substituted for the one used up to now. As the full box U is withdrawn, its entrance aperture is blocked by a shutter which is automatically latched in that position and cannot be released from without.

For a while, until the exhaustion of the remaining credit balance, the pumps can still be operated. Since, however, the reading of register M cannot be increased at this time, it soon becomes necessary to insert an empty box U into the holder 110 whereupon the counter N is automatically reset by control unit K, in response to a signal from monitoring unit R, and the conveyor W is reactivated to permit a resumption of the aforedescribed operations.

If a partly filled cash box is temporarily removed from its holder, e.g. before the station is closed up at night, its entrance opening is sealed as before by the shutter. Upon subsequent reinsertion of that box, however, a release mechanism controlled by monitoring unit R unlatches the shutter so that the deposition of cash in the box can continue up to the established ceiling. The release of the shutter will be prevented under certain conditions, as described hereinafter; conveyor W remains disabled in the absence of a properly coded box not yet filled to its limit.

The aforedescribed coding of the connectors $D_1$–$D_4$, $E_1$–$E_4$ prevents the station personnel from switching the pulse generators $C_1$–$C_4$ so as to let the rate-measuring pulses for a more expensive fuel reach an input of control unit K associated with a cheaper fuel.

DETAILED DESCRIPTION

Figure 2:
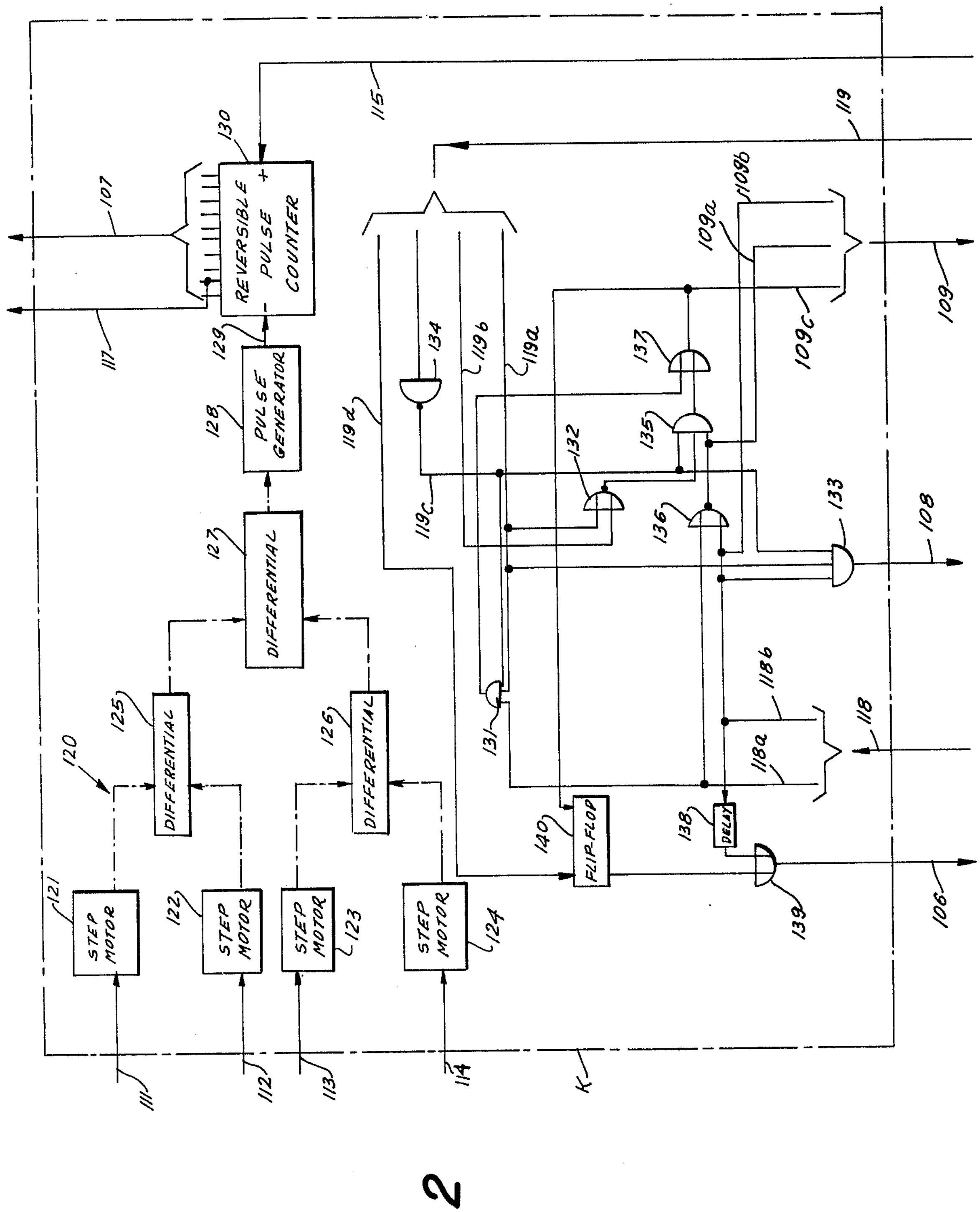
FIG. 2 is a more detailed circuit diagram of a control unit forming part of the system of FIG. 1.

In FIG. 2 we have shown details of control unit K whose inputs 111–114 feed a subunit 120 designed to combine the fuel-dispensation rates represented by the pulse cadences of generators $A_1$–$A_4$. Since these pulse generators operate asynchronously, their digital output signals (as modified by the interposed converters $H_1$–$H_4$) are translated into analog values which are then algebraically combined before being reconverted into pulses. Thus, leads 111–114 energize associated step motors 121, 122, 123, 124 working into respective inputs of a pair of differential gearings 125 and 126 in cascade with a third differential gearing 127 whose output drives a pulse generator 128. It will be readily apparent that the pulse rate of the latter generator will be proportional at any time to the sum of the pulse rates on leads 111–114 and will therefore be representative of the combined quantity of dispensed fuels weighted according to price.

The reversible pulse counter 130, referred to above, has a forward-stepping input connected to lead 115 and a backward-stepping input connected to an output lead 129 of pulse generator 128. With each pulse of that generator assigned to the same monetary value (e.g. 5 cents) as each counting pulse appearing on lead 115, counter 130 will have a reading equal to the difference between the wholesale price of the fuel sold at retail and the cash actually deposited in box U. Since cash is usually collected after the filling of a customer's tank, that difference will generally be negative; as already mentioned, however, counter 130 may be given an initial positive setting which represents the credit allowed to the operator, with energization of output lead 117 by that counter when its contents have been reduced to zero or some other low value. Multiple 107 transmits the count to the register M, shown in FIG. 1, which includes a conventional decoder for the conversion of binary signals into decimal readings.

A logic network within unit K communicates with pulse counter N, monitoring unit R and switch Y (FIG. 1) via conductors 108, 118, 109, 119 and 106. Multiple 119 comprises four conductors **119*a*, 119*b*, 119*c* and 119*d*, the first of them terminating at respective inputs of an AND gate 131 and a NOR gate 132. As well as at an input of a further AND gate 133. Conductor 119*b* extends to another input of NOR gate 132. Conductor 119*c*, containing an inverter 134, feeds other inputs of AND gates 131 and 133 as well as an input of another AND gate 135. Multiple 118 consists of two conductors 118*a* and 118*b*. Conductor 118*a* extends to a third input of AND gate 131 and to an input of another NOR gate 136; conductor 118*b* is connected to other inputs of AND gate 133 and NOR gate 136 as well as to a delay network 138 feeding an OR gate 139 whose output is the lead 106. AND gates 131 and 135 work into still another OR gate 137 having as its output lead a conductor 109c forming part of multiple 109. The other two conductors 109a and 109b of this multiple are the output lead of NOR gate 136 and an extension of lead 118b. Conductor 108 is the output lead of AND gate 133. A flip-flop 140, whose set output energizes another input of OR gate 139, has setting and resetting inputs tied to conductors 119d and 119c**, respectively.

Figure 3:
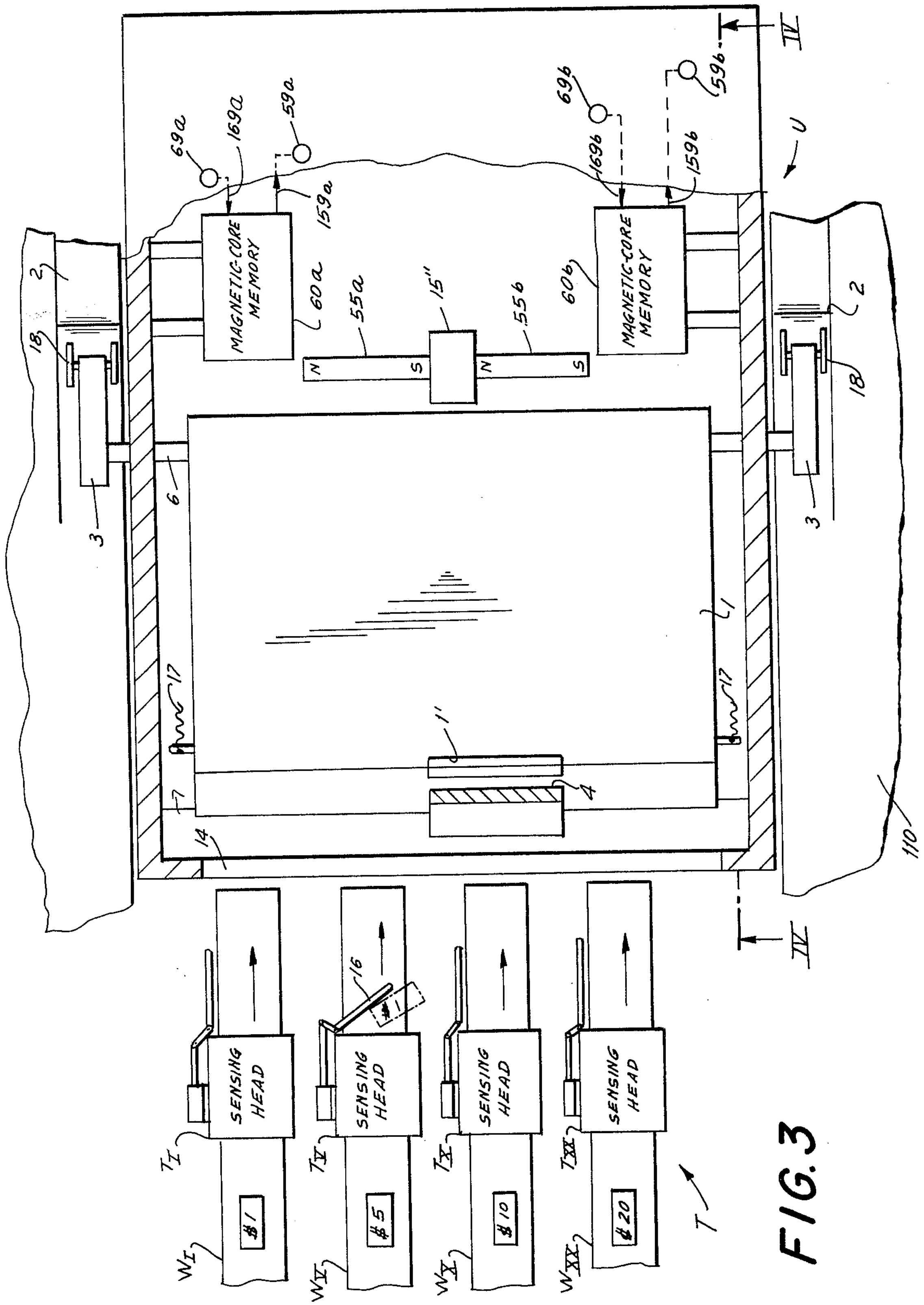
FIG. 3 is a somewhat diagrammatic plan view, with parts broken away, of a cash box and associated elements included in the system of FIG. 1.
Figure 4:
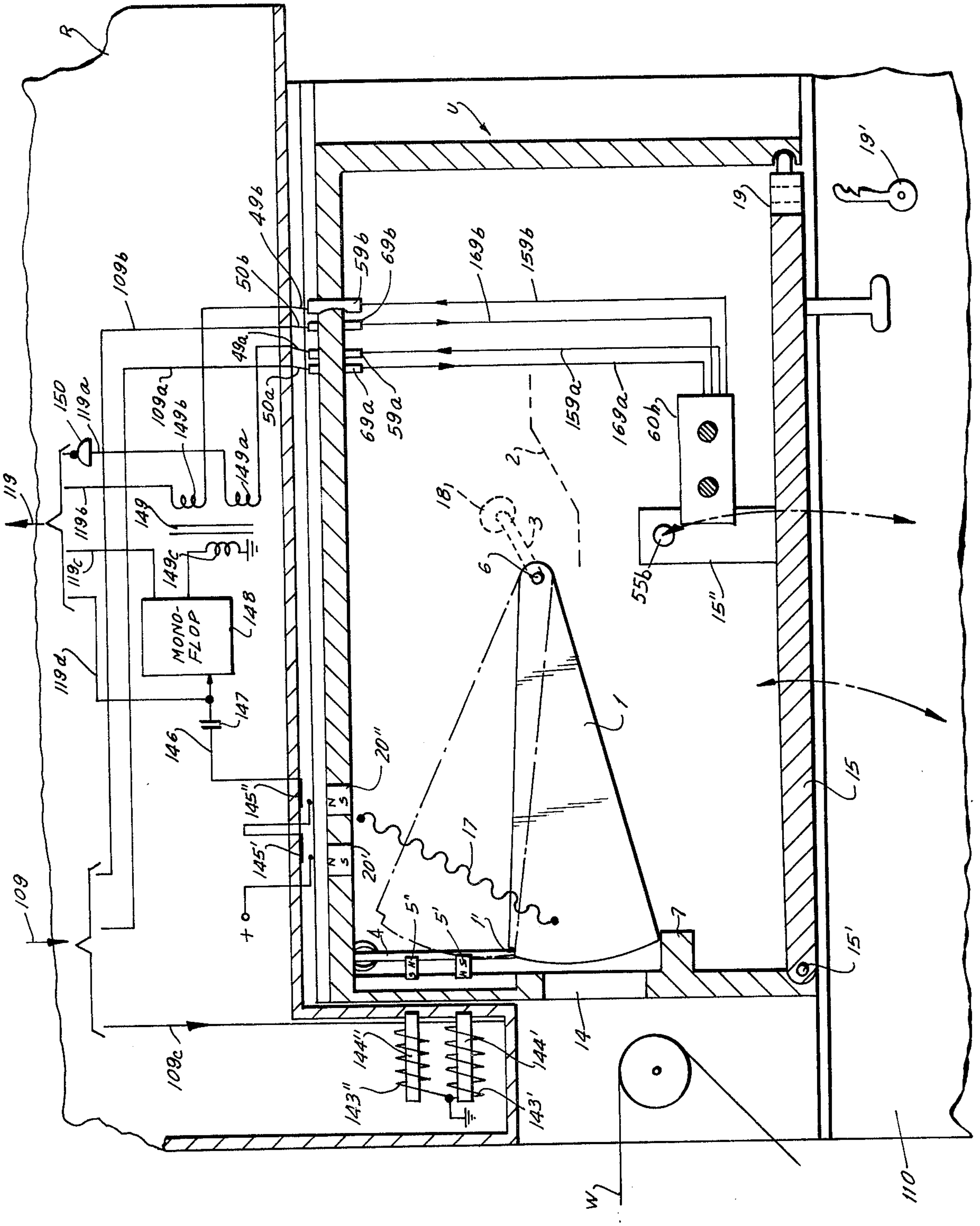
FIG. 4 is a cross-sectional view of the cash box, taken on the line IV—IV of FIG. 3.

FIGS. 3 and 4 show the cash box U inserted into its holder 110, with entrance aperture 14 closely spaced from the conveyor W which is fixedly positioned with reference to the holder. As seen in FIG. 3, the conveyor comprises four parallel and concurrently driven endless transport belts $W_I$, $W_V$, $W_X$ and $W_{XX}$ designed to receive bills in denominations of 1, 5, 10 and 20 dollars, respectively. Money tester T, accordingly, has four sensing heads $T_I$, $T_V$, $T_X$ and $T_{XX}$ respectively overlying these transport belts to scan the bills carried by them to entrance aperture 14. Each sensing head operates, in a manner well known per se, to detect characteristic elements of a bill such as proper thickness and color contrasts appearing at certain locations. If the test is positive, the bill is allowed to pass into box U. If it is negative, a baffle 16 is swung across the conveyor belt to deflect the bill (which may be badly damaged, counterfeit or of the wrong denomination) onto an underlying tray as particularly illustrated for sensing head $T_V$. The sensing heads also report positive tests to the evaluator P as described hereinafter with reference to FIG. 6.

Cash box U contains a generally wedge-shaped shutter 1 rigid with a horizontal shaft 6, the broad end of this shutter coming to rest on a ledge 7 of the front wall of the box in a blocking position in which that end obstructs the entrance aperture 14. In that blocking position, illustrated in FIG. 4, shutter 1 is latched by a leaf spring 4 engaging its upper edge so as to prevent its return into an unblocking position which has been indicated in dot-dash lines and into which the shutter is urged by a pair of coil springs 17. Shaft 6, traversing the sidewalls of the box, carries a pair of external levers 3 with rollers 18 which ride up a pair of ramps 2 of holder 110 when the box is withdrawn from the holder toward the right, as viewed in FIGS. 3 and 4, such withdrawal thus camming the shutter 1 into its blocking position in which the leaf spring 4 snaps into a recess 1' at the top of the shutter from which it cannot be dislodged by someone reaching into the box through aperture 14. If necessary, the box may have inner ribs or the like barring the insertion of hooks or needles with the intention of disengaging the spring 4 from the shutter.

Such disengagement, i.e. the unlatching of the shutter from its blocking position, can be effected only electromagnetically with the aid of coils 143', 143" connected with opposite modes of polarization between ground and conductor 109c of multiple 109. These coils have cores 144', 144" confronting, through the nonmagnetic front wall of box U, a pair of permanent magnets 5' and 5" on leaf spring 4. Magnets 5' and 5" are oppositely polarized and will therefore be attracted simultaneously upon the passage of a current of a certain polarity through conductor 109c. These magnets and the associated coils are representative of a more elaborate array designed to prevent the release of the shutter, upon extraction of the box from its holder, by magnets pressed randomly against its front wall.

The bottom wall 15 of box U is hinged to its front wall at 15' and has a lock 19 engaging its rear wall to hold the box closed. A key 19' in the possession of an authorized person allows the bottom wall 15 to be swung downwardly so as to open the box and to remove the cash deposited therein.

A pair of concealed magnets 20', 20" in the top of box U close, in its insertion position, two serially connected reed switches 145' and 145" to energize a lead 146 which is coupled through a capacitor 147 to conductor 119d and also to a triggering input of a monoflop 148. The latter, upon being thus triggered, sends a starting pulse of limited duration from its off-normal output to the primary winding 149c of a transformer 149 having two secondaries 149a and 149b in series with conductors 119a and 119b, respectively, of multiple 119. Conductor 119c, normally energized from another output of monoflop 148, carries only low voltage at the time of the start pulse which is thus reproduced in the output of the inverter 134 shown in FIG. 2.

Leads 119a and 119b extend through windings 149a and 149b to a pair of contacts 49a, 49b which are engaged by respective terminals 59a, 59b, passing insulatedly through the top wall of box U, when the box is placed in its illustrated insertion position. Terminals 59a and 59b have leads 159a, 159b which extend to nonillustrated magnetics cores in a pair of static memories 60a, 60b disposed within the box. These magnetic cores can be set by pulses on two other conductors 169a, 169b which extend to terminals 69a, 69b that are engaged in the insertion position by contacts 50a, 50b connected to conductors 109a and 109b, respectively. The temporary energization of leads 159a and 159b by transformer 149 constitutes a reading pulse which detects the state of these magnetic cores and gives rise to a corresponding current flow on conductors 119a and 119b, the intensity of that current flow being of binary value "1" when the respective core is set. Two permanent magnets 55a and 55b, carried on a support 15" rising from bottom wall 15, swing past these magnetic cores to reset them when the box is opened. Thus the two memories 60a and 60b transmit a reading "0" to conductors 159a and 159b whenever the box U is inserted into the holder 110 after having been opened and reclosed; thanks to the presence of an inverter 150, however, conductor 119a carries a binary signal "1" when memory 60a is reset to indicate an empty box.

As seen in FIG. 3, the terminals 59a, 59b and 69a, 69b, are relatively staggered in what may be considered a coded array inasmuch as the monitoring unit R will operate only if the position of these terminals matches that of the corresponding contacts 49a, 49b and 50a, 50b. These contacts and terminals could also be replaced by capacitive or inductive couplings whose locations will not be apparent from an inspection of the box U.

In a similar manner, magnets 20' and 20" may be part of a larger, coded array for the simultaneous closure of a corresponding number of serially interconnected switches such as those shown at 145' and 145".

Figure 5:
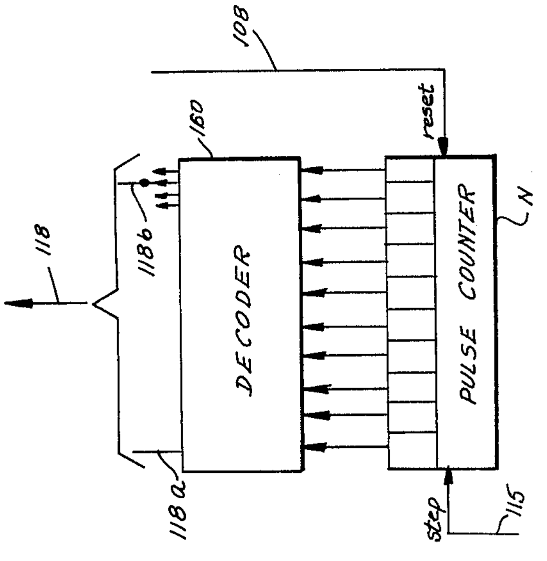
FIG. 5 shows details of a presettable pulse counter and associated circuitry co-operating with the control unit of FIG. 2.

FIG. 5 shows details of the binary pulse counter N which is stepped by pulses on lead 115 and reset by a pulse on lead 108. Conductors 118a, and 118b extend from a decoder 160 having inputs connected to respective stage outputs of the pulse counter. The decoder energizes the conductor 118a when the reading of counter N is zero. Conductor 118b may be connected to any of several decoder outputs for energization as soon as the count reaches a selected numerical value.

Figure 6:
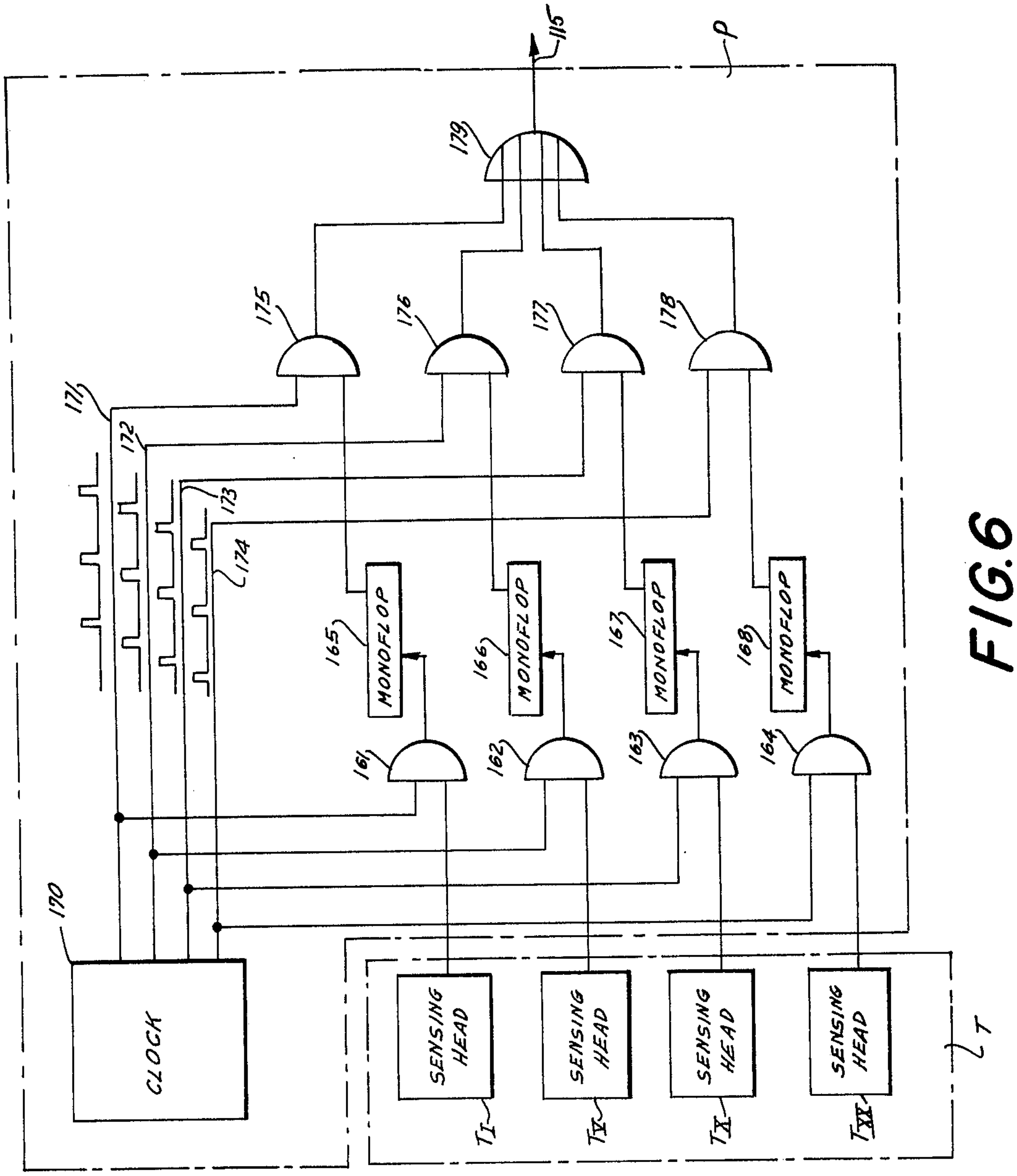
FIG. 6 is a circuit diagram of an evaluator associated with a money tester included in the assembly of FIG. 3.

As illustrated in FIG. 6, evaluator P comprises four AND gates 161, 162, 163 and 164 respectively receiving the outputs of sensing heads $T_I$, $T_V$, $T_X$ and $T_{XX}$ along with clock pulses appearing on output leads 171, 172, 173 and 174 of a timer 170. The clock pulses on leads 171–174 are relatively staggered, as shown, and are also fed to respective AND gates 175, 176, 177 and 178 on the input side of an OR gate 179 whose output is the lead 115. AND gates 161–164 trigger respective monoflops 165, 166, 167 and 168 delivering pulses of different duration to the other inputs of AND gates 175–178. Monoflop 165 has an off-normal period of one clock cycle so that gates 175 and 179 will pass one clock pulse when this monoflop is triggered. Owing to their progressively longer off-normal periods, monoflops 166, 167 and 168 will give rise to sequences of 5, 10 and 20 pulses in the outputs of gates 176, 177 and 178, respectively. Thanks to the staggering of the clock pulses, the output pulses of the several AND gates 175–178 will not coincide or overlap in OR gate 179 so that the number of pulses in a composite sequence on lead 115 will reflect the combined monetary value of two, three or four bills passing approximately simultaneously underneath the sensing heads of money tester T. This monetary value, accordingly, will be correctly indicated by the counters N and 130 as well as the totalizer O which are stepped by the pulses on lead 115.

Upon the insertion of box U into holder 110, switches 145' and 145" close to generate the aforedescribed start pulse on conductor **119*c* which energizes one input each of AND gates 131, 133 and 135. If the box is empty, i.e. if neither of its memories 60*a* and 60*b* is set, conductor 119*a* will be energized to open AND gate 133, provided that counter N registers the maximum value or ceiling which energizes the lead 118*b*. The conduction of AND gate 133 resets the counter N to zero, by way of lead 108, whereupon conductor 118*a* is energized in lieu of conductor 118*b*. Since conductor 119*a* still carries high voltage, gate 131 now contacts and energizes the lead 109*c* via OR gate 137, thereby releasing the shutter 1 from its blocking position as described above. With the shutter now elevated by the springs 17 into its retracted position, entrance aperture 14** of box U is open to receive money placed on conveyor W.

The pulse on conductor **109*c* also resets the flip-flop 140 so that, with the de-energization of conductor 118*b*, high voltage is removed from both inputs of OR gate 139 and thus from lead 106 whereby the previously opened switch Y (FIG. 1) is reclosed to start or at least activate the conveyor drive including motor Q. The operator can now deposit money in box U until the counter N arrives again at its preset ceiling. Upon the first step taken by this counter, both conductors of multiple 118 are de-energized so that NOR gate 136 becomes conductive, thereby placing high voltage on lead 109*a* to set the memory 60*a* via contact 50*a*, terminal 69*a* and lead 169*a*. When the ceiling is reached, high voltage on conductor 118*b* is transmitted by way of lead 109*b*, contact 50*b* and terminal 69*b* to lead 169*b* for setting the memory 60*b*. After a slight time lag, caused by delay network 138, level 106** is re-energized to open the switch Y and deactivate the conveyor W.

Upon the withdrawal of box U from holder 110, the reopening of reed switches 145' and 145" generates on conductor **119*d* a pulse which sets the flip-flop 140. Thus, the conveyor W is disabled also when the box U is removed in an only partly filled condition, i.e. prior to energization of conductor 118*b*. Upon the subsequent reinsertion of such a partly filled box, the start pulse on conductor 119*c* coincides with low voltage on conductors 119*a* and 119*b* whereby NOR gate 132 conducts in addition to NOR gate 136. This opens the AND gate 135 to energize, by way of OR gate 137, the conductor 109*c* whereby flip-flop 140 is again reset, shutter 1 is withdrawn and the conveyor W is reactivated inasmuch as conductor 118*b*** is still de-energized.

If, through error or otherwise, an empty cash box were introduced into holder 110 while the counter N registered an intermediate value between zero and its ceiling, such insertion would produce high voltage on conductor **119*a* whereby NOR gate 132 would be blocked and AND gate 135 would remain cut off, thus preventing the energization of conductor 109*c* with release of shutter 1 and resetting of flip-flop 140. The station operator is thus compelled to fill the available cash boxes in an orderly manner instead of depositing near-ceiling amounts in whatever cash boxes are at his disposal. The complete filling of a cash box may be signaled to the central office by an extension of conductor 118*b* to the remote computer 100**.

The illustrated logical circuitry could be readily modified to provide for the presence of one or more additional static memories in each cash box U to indicate the degree of filling with greater precision, e.g. to register counts of approximately one half or of one and two thirds of the maximum value preset in counter N. Such modification would then permit the operative emplacement of a box only if the data stored therein indicated a degree of filling consistent, within certain limits, with the reading of counter N at the time of insertion.

We claim:

1. In a filling station including pump means for the dispensation of liquid products, said pump means having at least one outlet provided with a flowmeter for measuring the quantity of liquid dispensed, the combination thereof with:

a receptacle with an entrance aperture for the deposition of cash received by station personnel for the sale of metered products, the interior of said receptacle being otherwise inaccessible to the station personnel;

test means adjacent said receptacle for ascertaining the value of money passed through said entrance aperture;

first signaling means coupled with said test means for generating signals representative of the amount of money deposited in said receptacle;

second signaling means coupled with said flowmeter for generating signals representative of the monetary value of the product dispensed;

arithmetic means connected to said first and second signaling means for registering a credit balance equal to an initial credit augmented by said amount of money and diminished by said monetary value; and stop means connected by said arithmetic means for deactivating said pump means upon said credit balance dropping to a predetermined minimum.

2. The combination defined in claim 1 wherein said pump means comprises a plurality of pumps each provided with an electric drive motor, said stop means comprising circuit breakers in circuit with the drive motors of all said pumps.

3. The combination defined in claim 2 wherein said second signaling means includes a plurality of pulse generators, each driven from the flowmeter of a respective pump, and summing means connected to said pulse generators for delivering the combined outputs thereof to said arithmetic means.

4. The combination defined in claim 3 wherein said summing means has a plurality of input terminals each connected to a respective pulse generator through a coded coupling preventing a relative transposition of said pulse generators and input terminals, said coded coupling completing an energizing circuit for the respective drive motor by way of the associated circuit breaker.

5. The combination defined in claim 3, further comprising adjustable conversion means inserted between said pulse generators and said summing means for modifying the pulse rates in the outputs of said pulse generators in conformity with current prices of the dispensed products.

6. The combination defined in claim 3 wherein said drive motors, said pulse generators and said arithmetic means have energizing circuits connected to a communal power supply, further comprising storage means independent of said power supply connected to said second signaling means for preserving information relating to the monetary values of the dispensed products.

7. The combination defined in claim 3, further comprising individual pulse counters respectively connected to said pulse generators, said pulse counters being provided with output connections for the reading of their contents from a remote location.

8. The combination defined in claim 3 wherein said first signaling means comprises a source of pulse sequences, said arithmetic means including a reversible pulse counter with forward-counting and backward-counting inputs respectively connected to said source and to said summing means.

9. The combination defined in claim 8, further comprising a totalizer connected to said source for registering the sum of moneys deposited during an extended period.

10. The combination defined in claim 1, further comprising register means connected to said first signaling means for indicating the amount of money deposited in said receptacle, said register means being presettable to a selected ceiling for said amount, and blocking means controlled by said register means for preventing the passing of further money through said entrance aperture upon said amount reaching said ceiling.

11. The combination defined in claim 10, further comprising transport means for feeding money to be deposited past said test means, said blocking means including an interruptor for deactivating said transport means.

12. The combination defined in claim 10, further comprising a holder for removably supporting said receptacle in line with said transport means.

13. The combination defined in claim 12 wherein said receptacle is internally provided with a shutter for obstructing said entrance aperture upon withdrawal of said receptacle from said holder, said shutter having an extension cammingly engageable with a formation on said holder during said withdrawal.

14. The combination defined in claim 13 wherein said receptacle is provided with internal detent means for latching said shutter in its obstructing position, further comprising release means for said detent means effective upon insertion of said receptacle into said holder.

15. The combination defined in claim 14 wherein said receptacle is provided with a coding and said holder carries monitoring means for detecting said coding, said release means being controlled by said monitoring means.

16. The combination defined in claim 15, further comprising static memory means in said receptacle for storing data relating to the degree of filling of said receptacle with deposited money, said monitoring means including circuitry for establishing a connection from said memory means to said register means facilitating the transfer of data therebetween and for actuating said release means in response to the stored data only upon the deposited amount being less than said ceiling.

17. The combination defined in claim 16, further comprising a logic network connectable via said circuitry to said memory means and to said register means for inhibiting the actuation of said release means upon insertion of said receptacle with a degree of filling significantly less than the amount indicated by said register means.

18. The combination defined in claim 17, further comprising resetting means for said register means controlled by said logic network for becoming effective upon insertion of said receptacle in an empty state with said register means indicating an amount at least equal to said ceiling.

19. The combination defined in claim 16 wherein said memory means is of the magnetic-core type, said receptacle being provided with a normally locked wall member displaceable into an open position upon unlocking thereof for removal of the deposited money be an authorized person, further comprising magnetic erasing means controlled by said wall member to move past said memory means for resetting same upon displacement of said wall member into said open position.

20. The combination defined in claim 14 wherein said release means comprises an electromagnetic coil.

* * * * *